United States Patent [19]
Koelzer

[11] Patent Number: 5,709,246
[45] Date of Patent: Jan. 20, 1998

[54] BOOSTER VALVE WITH CONTAMINANT EJECTION FOR USE IN A PNEUMATIC BRAKE SYSTEM

[75] Inventor: Robert Koelzer, Kearney, Mo.

[73] Assignee: Midland Brake, Inc., Kansas City, Mo.

[21] Appl. No.: 743,251

[22] Filed: Nov. 4, 1996

[51] Int. Cl.$^6$ .................................................. F15B 13/042
[52] U.S. Cl. ........................................ 137/627.5; 137/204
[58] Field of Search ................................. 137/204, 627.5

[56] References Cited

U.S. PATENT DOCUMENTS

| | | |
|---|---|---|
| 1,761,309 | 6/1930 | Neale . |
| 2,545,506 | 3/1951 | Walsh . |
| 3,145,625 | 8/1964 | Randol . |
| 3,834,767 | 9/1974 | Bullinger . |
| 3,853,357 | 12/1974 | Hitzelberger . |
| 3,921,501 | 11/1975 | Rosback . |
| 3,967,706 | 7/1976 | King . |
| 3,972,341 | 8/1976 | Wheless . |
| 4,764,189 | 8/1988 | Yanagawa et al. . |
| 5,031,404 | 7/1991 | Flory et al. . |
| 5,154,204 | 10/1992 | Hatzikazakis . |
| 5,261,458 | 11/1993 | Johnson et al. ............ 137/627.5 |
| 5,460,076 | 10/1995 | Pierce et al. . |

Primary Examiner—Gerald A. Michalsky
Attorney, Agent, or Firm—St. Onge Steward Johnston & Reens

[57] ABSTRACT

A contaminant-ejecting, pneumatically-controlled brake booster valve is disclosed. The valve comprises an exhaust piston slidably mounted within the stem of a main piston of the valve, wherein the exhaust piston is actuated by supply air pressure to periodically open and close an exhaust passageway leading from the main piston chamber to an exhaust area. Pressurized supply air normally forces the exhaust piston in the exhaust passage blocking position thereby preventing the escape of control air through the exhaust passageway. When supply pressure is released (e.g. when the parking brake is applied), pressurized control air forces the exhaust piston upward, allowing some of the control air to escape through the exhaust passageway to the exhaust area. The escaping control air expels any moisture or other contaminants that may have accumulated in the main piston chamber. Additionally, a check valve is positioned in an orifice of the main piston. The check valve prevents control air from flowing through the orifice when control air is applied (i.e., when the brakes are applied) and allows delivery air to flow in the opposite direction when control air is released to equalize the pressure on both sides of the main piston and in the main piston chamber.

15 Claims, 6 Drawing Sheets

BOOSTER VALVE WITH CONTAMINANT EJECTION FOR USE IN A PNEUMATIC BRAKE SYSTEM

FIELD OF THE INVENTION

The invention relates to a booster valve for a pneumatic brake system and, in particular, to a booster valve having the ability to periodically purge contaminants therefrom and the ability to equalize delivery air pressure on both sides of a main piston housed therein.

BACKGROUND OF THE INVENTION

Pneumatic brake systems which use pressurized air to operate the service brakes are known in the art. Booster valves are known and are sometimes desirable to boost the control line of the pneumatic brake system to obtain appropriate service brake response for the trailer. The booster valve enhances the control signal to the service brake system providing quicker brake application and release. This allows for quicker and safer stops, prevents jackknifing of the tractor and trailer and increases brake and tire useful life on the trailer and tractor.

One problem associated with valves used in these pneumatic brake systems resides in the unequal build-up of delivery air pressure that tends to occur on one side of a main piston housed therein. It is known to put an orifice through the face of the main piston in an attempt to equalize the pressure. This orifice, if left opened all the time, does not prevent operation of the booster valve, however, because it tends to be very small and generally the pressurized control air flows at a high rate. Thus, the control air is still able to properly function even if some of it escapes.

The problem arises, however, when the rate of flow of the control air is low when the brakes are applied. In this situation, because pressurized air leaks through the orifice, the control air pressure does not reach sufficient pressure to actuate the valve. When this happens, problems result; for example, the booster valve may fail to properly transmit delivery air to the service relay valve.

It is known to use valves to equalize pressure on opposite sides of a device. For example, U.S. Pat. No. 3,145,625 to G. T. Randol discloses a control valve mechanism for servomotors and the like. In particular, Randol shows a poppet valve (198) in FIG. 2 which controls the air pressure difference between two locations during brake application and brake release modes. In the brake application mode, the poppet valve is seated to enable the establishment of negative pressure in chamber 45; thus, it serves to produce pressure differences in variable pressure (vacuum) power chamber 45 and a constant pressure (atmospheric) chamber 46 for power-activation of the booster motor valve (VM).

U.S. Pat. No. 3,921,501 discloses a check valve 52 which operates to equalize pressure between front chamber 40 and rear chamber 42. During braking, when air above atmospheric pressure is created in the rear chamber 42 and a vacuum in the front chamber 40, an operational pressure differential is created to move wall 37 and power brake actuator 16. If the difference is above a predetermined value, check valve 52 opens to reduce the pressure difference by allowing a portion of the air above atmospheric pressure to enter the front chamber 40. As a result, the braking system is protected from fluctuation in the vacuum level and the source of air above atmospheric pressure.

U.S. Pat. No. 5,031,404 to Flory et al. discloses a pressurized air booster having a check valve 230 having a mushroom cap 232 which overlaps a washer 236. The washer 236 covers a series of apertures which allow the flow of fluid from the vented area of booster 107 into chamber 157.

U.S. Pat. No. 5,460,076 to Pierce et al. discloses a brake actuator having a check valve 100 which extends through divider 52 to fluidly connect first and second spring chambers 62, 63 to reduce the vacuum in the first spring brake chamber during application of spring brake 14 so that application of the spring brake is not retarded by the vacuum.

Additional problems also arise through use of pneumatic brake systems. For example, in cold weather, users often inject alcohol and other de-icing compounds into the air brake system to keep the brake components from freezing. Alcohol is detrimental to the valves because it removes necessary lubricants from them and may also degrade seals and hoses. If alcohol builds up in the brake system, it may create a hydraulic-type system (which is a slower pressure transmitter than a dry pneumatic system) and/or it may vary the operating characteristics of the system due to the relative incompressibility of the liquid.

Air dryers are commonly used in pneumatic brake systems to remove condensates and other contaminates prior to delivery of air to storage reservoirs and the like. But contaminants can be introduced downstream from the air dryer; thus, they remain in the trailer brake system.

U.S. Pat. No. 5,154,204 to Hatzikazakis discloses a drain valve for removing moisture from these air dryers. The drain valve includes a spring which normally biases a ball against a seat thereby closing the valve. Periodically, pneumatic pressure is applied to a piston which unseats the ball and opens the valve, allowing any moisture accumulated in the air dryer to drain by the force of gravity. The 204 patent does not disclose pressurized ejection of moisture and other contaminants and the device taught is not generally usable to remove moisture which accumulates downstream in the braking system.

U.S. Pat. No. 3,967,706 to King discloses a brake actuator housing having a passage through which pressurized air may pass to purge contaminants which may enter the housing due to the environment in which the brake is used. The device taught by King provides for purging contaminants from the supply side of the system; however, it does not provide for purging contaminants from within the control side of the system; and thus, it is not effective in avoiding the above-mentioned problems.

What is desired therefore is a device which periodically purges contaminants from a pneumatic brake system and specifically from the control side of the booster valve in order to maintain optimal response and control of the pneumatic-ally-controlled brake system. A device which provides for the pressurized ejection of contaminants and which minimizes the control air/delivery air pressure difference is also desired.

SUMMARY OF THE INVENTION

Accordingly, it is an object of the present invention to provide a valve, for use with a pneumatic brake system, which is capable of ejecting contaminants, such as alcohol, which have been injected or have accumulated therein.

It is another object of the present invention to provide a valve, for use with a pneumatic brake system, which is capable of purging contaminants from a control side of the pneumatic system.

It is still another object of the present invention to provide a valve of the above character having an exhaust passage which is periodically opened to vent contaminants from the valve.

It is still a further object of the invention to provide a valve of the above character having a movable exhaust piston, housed within a stem of the main piston chamber, to open and close the exhaust passage.

It is yet a further object of the invention to provide a valve of the above character wherein the exhaust piston is actuated by control air pressure to open the exhaust passage.

It is an even further object of the present invention to provide a booster valve which has a check valve capable of minimizing the control air/delivery air pressure difference about a main piston.

These and other objects are achieved by provision of a contaminant-ejecting booster valve comprising: a housing enclosing a main chamber; a main piston movable between first and second positions; a control port in the housing in fluid communication with the main chamber for moving the main piston from the first to the second position; an exhaust port; an exhaust passage through the main piston connecting the main chamber and the exhaust port in fluid communication; and a blocking member which opens the exhaust passage under control pressure. When the exhaust passage is open, contaminants, such as alcohol, may be expelled from the chamber through the exhaust passage and to the exhaust port.

The valve also includes a supply port and a delivery port; the delivery port is in fluid communication with the supply port when the main piston is in the second position and is blocked from the supply port when the main piston is in the first position. Preferably, a spring biases the main piston to the first position.

Additionally, a check valve covers an orifice through the face of the main piston. The check valve is movable between an open and a closed position. When control air is applied and the pressure thereof is higher than the pressure of the delivery air, the check valve closes and prevents the flow of control air through the orifice and allows it to build up in the main piston chamber. When the pressure of the delivery air is greater than the pressure of the control air (such as when the control air pressure is released), the check valve opens and allows delivery air to flow through the orifice to equalize pressure on both sides of the main piston.

Preferably, the valve is a booster valve in a pneumatic brake system. Most preferably, the blocking member is an exhaust piston mounted in a hollow stem of the main piston and the exhaust passage extends from the main chamber to the hollow stem and from there to the exhaust port.

When the vehicle is being driven, pressurized supply air acts on an end of the exhaust piston and forces it to block the exhaust passageway. Pressurized control air exerts a substantially opposite force on the exhaust piston; however, this force is insufficient to overcome the force exerted by the supply air pressure when the vehicle is being driven.

When the supply air pressure is released (e.g., when the parking brake is applied), the pressurized control air acting on the exhaust piston overcomes the force of the released supply air and moves the exhaust piston to open the exhaust passage and allows escape of control air to the exhaust port. The escaping control air expels any moisture or other contaminants that may have accumulated on the main piston, in the main chamber and/or in the control air line. The contaminants travel from the main chamber, through the exhaust passage and out the exhaust port.

The check valve remains in a normally closed position when the vehicle is being driven and during the expulsion of contaminants. The check valve opens, in a manner discussed in more detail below, after the main piston has moved to the second position, allowing the transfer of delivery air, and it opens only if the pressure of the delivery air is greater than the pressure of the control air in the main piston chamber.

The invention and its particular features and advantages will become more apparent from the following detailed description when considered with reference to the accompanying drawings.

DETAILED DESCRIPTION OF THE INVENTION

Figure 1:
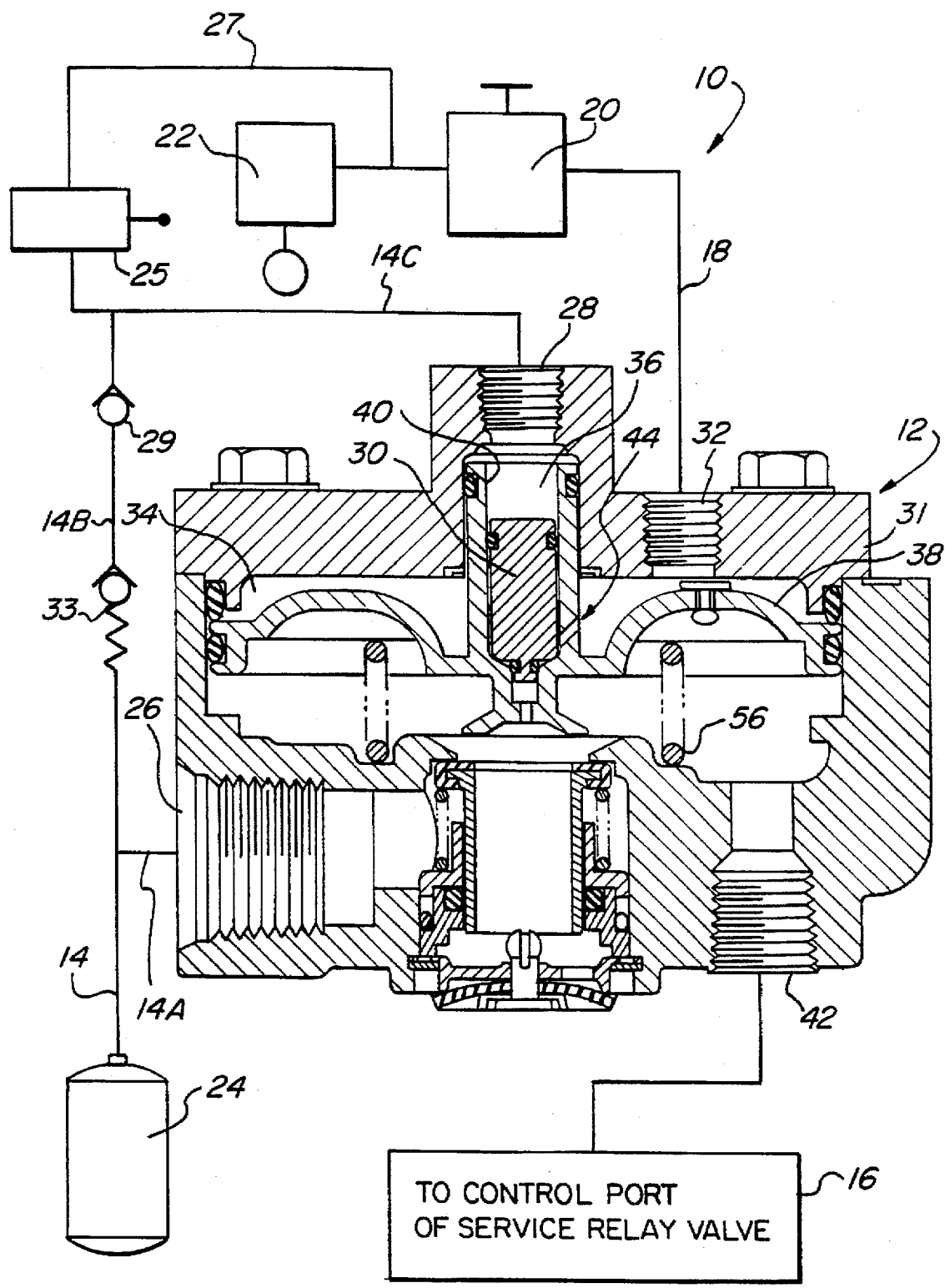
FIG. 1 is a partial schematic diagram of a brake system incorporating a contaminant-ejecting booster valve having a check valve, constructed in accordance with the present invention, the booster valve shown in cross-section.

Referring to the drawings in detail, a pneumatic brake system 10 comprising a booster valve 12, constructed in accordance with the present invention, is shown. As used in this description, the terms "up", "down", "top", "bottom", etc. refer to booster valve 12 when in the orientation illustrated in FIG. 1; however, it should be understood that the orientation shown is not necessary for operability.

Referring in detail to FIG. 1, the pneumatic brake system 10 of the invention comprises booster valve 12, connected between a supply air line 14, carrying pressurized supply air, and a control port of a service relay valve, shown schematically at 16. Control air line 18, carrying pressurized control air, actuates booster valve 12 to deliver pressurized supply air to the control port of the service relay valve 16. Pressurized control air is regulated by a brake pedal 20 which is connected to a conventional compressor 22, commonly known in the art. Supply air line 14 is connected to a reservoir 24 which may also be charged by a conventional compressor (not shown), commonly known in the art.

Supply pressure line 14 is connected by line 14A to port 26 and is connected by line 14B to supply port 28 where it actuates a secondary, exhaust piston 30 (discussed in detail below) for ejecting moisture and other contaminants from control air line 18 and from main piston chamber 34. A one-way check valve 29 and a pressure protection valve 33, both commonly known in the art, cooperate to desirably control the flow and pressure of the supply air along line 14B. Trailer supply air valve 25 is connected between compressor 22 and brake pedal 20 by line 27 at one end and combines with line 14B to form line 14C at the other end.

Figure 2:
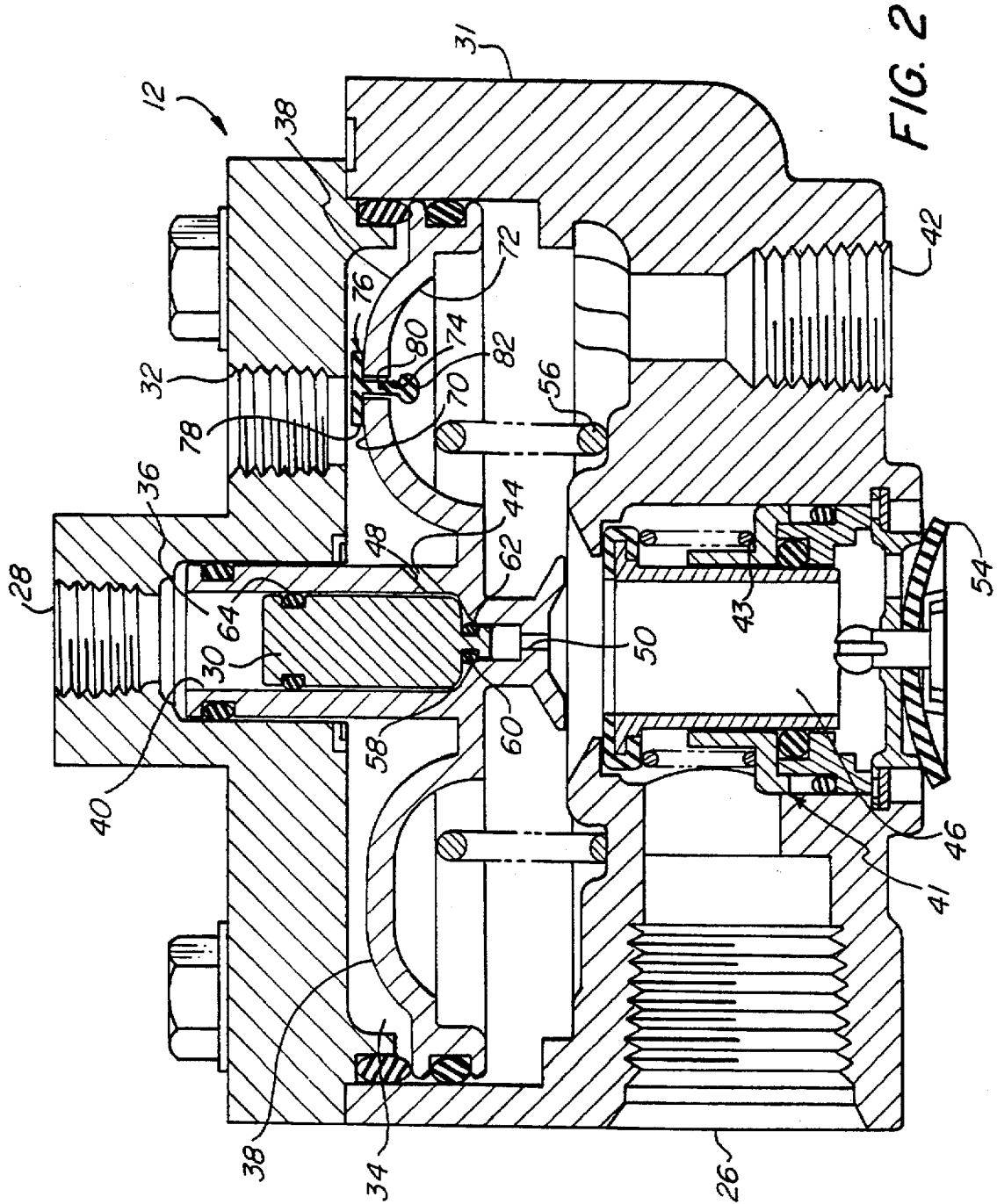
FIG. 2 is a cross-sectional view of the booster valve of FIG. 1, showing the position of a main and an exhaust piston and the check valve during normal operation (when the brakes are not applied), i.e., when pressurized supply air is applied but pressurized control air is not supplied.

Referring to FIG. 2, booster valve 12 comprises housing 31. Housing 31 has a control port 32 in fluid communication with the main piston chamber 34 for allowing the passage of pressurized control air therethrough. Housing 31 also has at least one supply port 28 in fluid communication with the main piston chamber 34 for allowing the passage of pressurized supply air therethrough; port 28 is in fluid communication with exhaust piston chamber 36 for actuating exhaust piston 30. Exhaust port 35 (shown in FIG. 4) is in fluid communication with control port 32.

Referring to FIG. 2, booster valve 12 comprises a main piston 38 disposed in chamber 34 of housing 31 and hollow stem 40. Main piston 38 is spring-biased upwardly via spring 56 and movable between an uppermost and lowermost position. Main piston 38 operates to connect a reservoir—or supply-port 26 with delivery port 42 for supplying pressure to the control port of the service relay valve (FIG. 1).

Valve 12 also comprises a blocking member 30 for permitting pressurized air from the control port 32 to expel or eject contaminants from the main piston chamber 34 through an exhaust passage 44. Most preferably, the blocking member comprises an exhaust piston 30 which is slidably mounted in the hollow stem 40 of main piston 38, between an exhaust passageway open (FIGS. 4–5) and closed (FIGS. 2–3) positions. Direction of the movement of exhaust piston 30 is best shown by the double-headed 41 arrow in FIG. 5.

Figure 4:
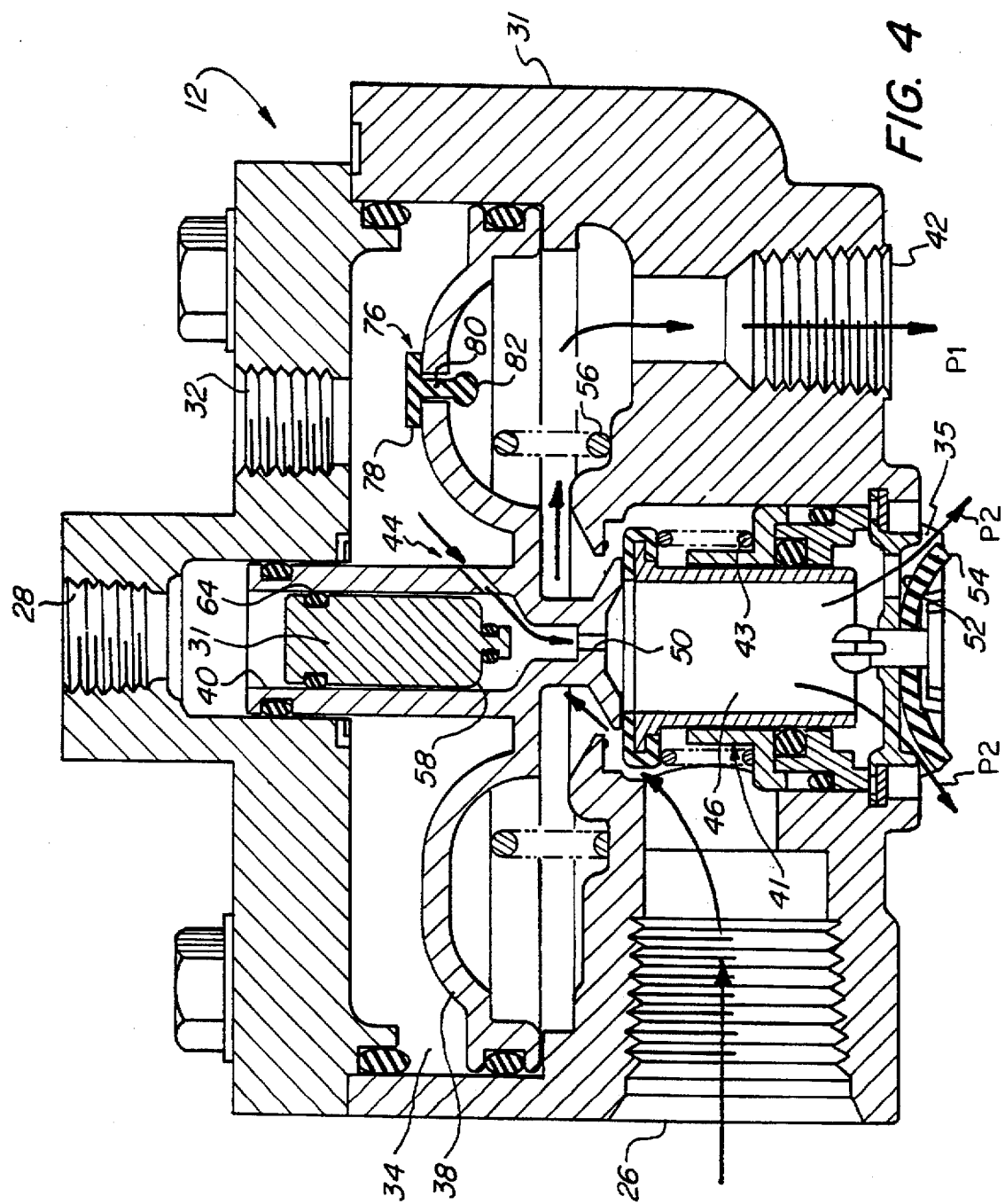
FIG. 4 is a cross-sectional view of the booster valve of FIG. 1 showing the position of the main and exhaust pistons and check valve during ejection of accumulated contaminants, i.e., when pressurized control air is applied and pressurized supply air is released.

It should be understood, however, that blocking member 30 can take on any size and shape so long as it is responsive to supply air for closing the exhaust passage 44 when pressurized supply air is supplied through the supply port 28 and for opening the exhaust passage 44 when under the influence of control air pressure upon substantial release of supply air to permit the expulsion of contaminants from the main piston chamber 34 through the exhaust passage 44 and to the exhaust port 35 (FIG. 4).

In the preferred embodiment, exhaust piston 30 is cylindrical in shape and preferably includes a shoulder and neck portion 58, 60, respectively (FIG. 2). Exhaust piston 30 includes two seals 62, 64 (FIG. 3), one of which 62 is located on neck portion 60. The neck portion 60 of exhaust piston 30, together with the seal 62 located thereon, blocks exhaust passageway 44 when pressurized supply air is applied. See FIGS. 2, 3. As will be further described below, shoulder and neck portions 58, 60 of exhaust piston 30 provide surfaces over which pressurized control air acts to move exhaust piston 30.

As best shown in FIGS. 2–5, main piston 38 comprises an exhaust passageway 44 which, when open, creates a path from main piston chamber 34 to an exhaust area 46 to the exhaust port 35 (FIG. 4). In the most preferred embodiment, exhaust passageway 44 consists of three sections: a first section 48 (FIG. 2), which is comprised of a hole bored through the wall of hollow stem 40 creating a passageway between hollow stem 40 and main piston chamber 34; a second section 50, which is comprised of a hole connecting hollow stem 40 to exhaust area 46; and a third section 52 (FIG. 4), which connects exhaust area 46 to exhaust port 35 (FIG. 4). Exhaust area 46 may lead to the exhaust port 35 (or atmosphere) via, for example, a conventional leaf valve 54 as shown by the arrows along path P2.

Referring in detail to FIGS. 2–5, main piston 38 further comprises two sides 70, 72 and an orifice 74 therethrough.

Check valve 76 is positioned in the orifice and covers the orifice 74 and is movable between an open position (FIG. 5) and a closed position (FIGS. 1–4, 6). Check valve 76 is closed to prevent the flow of control air through orifice 74 when control air is applied and opens to allow delivery air to flow into main chamber 34 when control air is released to equalize pressure on both sides 70, 72 of the main piston 38.

Check valve 76 may take on any size and shape sufficient to block the flow of control air through orifice 74 when control air is applied and to allow the flow of delivery air through orifice 74 when control air is released. In the preferred embodiment, check valve 76 comprises cap 78, sized sufficiently to cover orifice 74, and which is attached to one end of elongated, narrow stem 80. Stem 80, which is sized sufficiently to move freely within orifice 74, is attached at the other end to ball member 82, which has a diameter larger than orifice 74 and acts as a stop member for delimiting the upward movement of valve 76.

FIG. 2 illustrates the position of booster valve 12 during normal operation of the vehicle (i.e., when the brakes are not applied). Pressurized control air through line 18 has not been applied, thus the spring 56 biases main piston 38 in the uppermost position. Pressurized supply air has been actuated; thus the pressurized supply air delivered through supply port 28 maintains exhaust piston 30 in the lowermost position, thereby blocking exhaust passage 44 and preventing the escape of control air and any contaminants from main piston chamber 34.

During normal operation (FIG. 2), meeting surface 45 of delivery valve 41 and meeting surface 47 of main piston 38 (best shown in FIGS. 3, 4), are sealed against each other preventing supply port 26 from being in fluid communication with delivery port 42.

Figure 3:
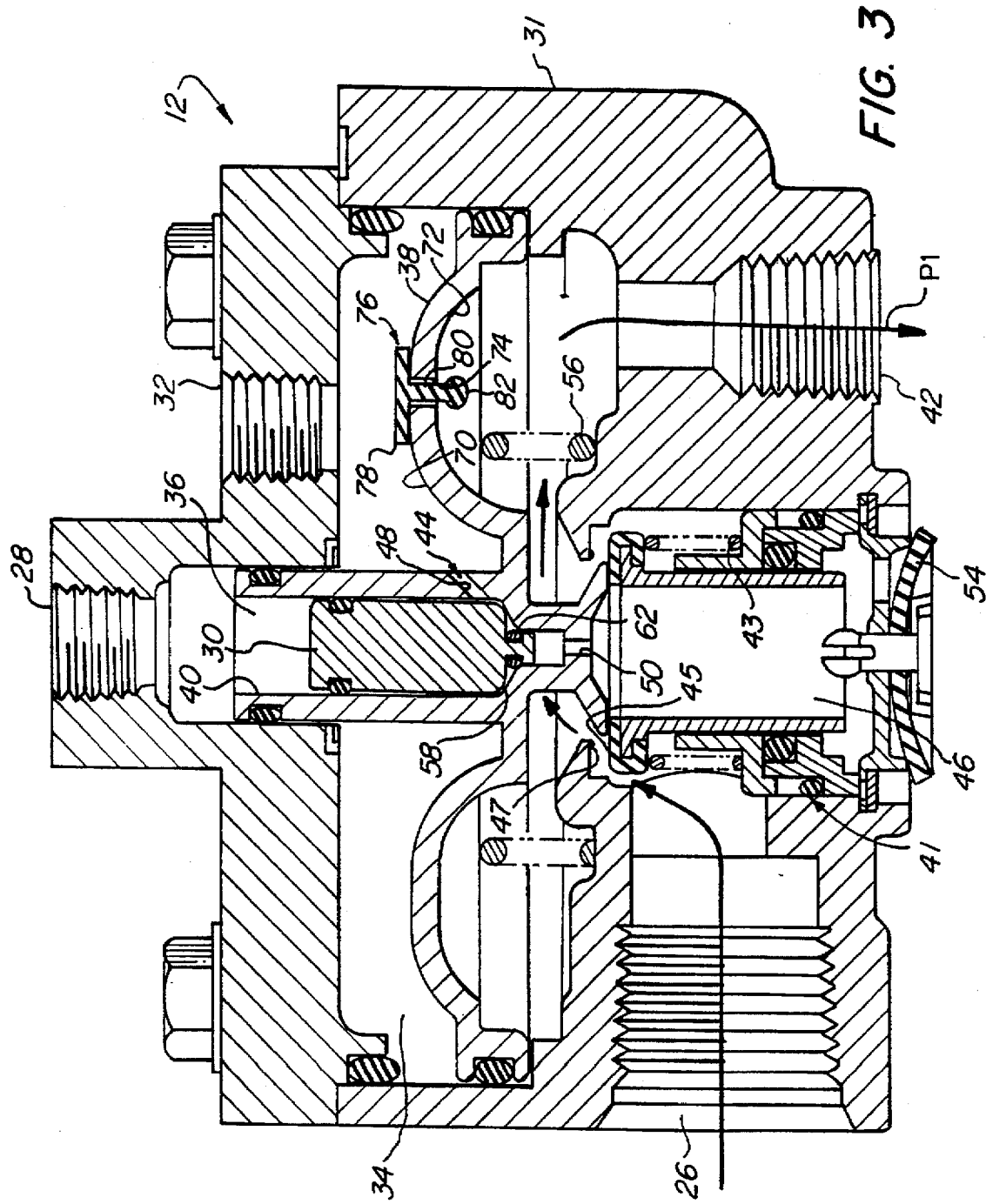
FIG. 3 is a cross-sectional view of the booster valve of FIG. 1 showing the position of the main and exhaust pistons and check valve during braking, i.e., when pressurized supply air and pressurized control air are both applied.

FIG. 3 illustrates the position of the booster valve 12 during application of the brake pedal 20 (FIG. 1). Application of a user's foot to the brake pedal 20 (FIG. 1) causes pressurized control air to pass through control air line 18 (FIG. 1), causing pressurized control air to act upon main piston 38 through control air port 32. Pressurized control air urges main piston 38 downwardly, overcoming the force of spring 56, thereby connecting pressurized supply air from reservoir/supply port 26 to the control port of the relay valve at 16 through delivery port 42 via delivery valve 41 along the path indicated by P1.

Delivery valve 41 moves between a normally closed position (shown in FIGS. 1, 2, 5) and an open position (FIGS. 3–4). When open, supply port 26 is in fluid communication with delivery port 42 and pressurized supply air flows along the path indicated by P1. Delivery valve 41 is normally spring-biased to a delivery closed position via spring 43. When pressurized control air acts on or otherwise influences main piston 38 forcing it downwardly, delivery valve 41 becomes unseated, i.e., delivery valve meeting surface 45 becomes displaced from meeting surface 47 allowing the supply port 26 and the delivery port 42 to be in fluid communication with each other and in a delivery open position.

During application of the brakes, pressurized supply air remains high such that exhaust piston 30 moves in tandem with main piston 38 and remains fixed in relation thereto. That is, exhaust passageway 44 remains blocked by exhaust piston 30 and no control air is allowed to escape therethrough. It should be appreciated that the pressurized supply air acting on exhaust piston 30 also serves to move the main piston 38; however, this may be compensated for by adjusting the elasticity of spring 56.

During braking, the area between seals 62, 64 of the exhaust piston 30 is pressurized by control air. Since the diameter of exhaust piston 30 through seal 62 is less than the diameter of seal 64, the pressurized control air acting on exhaust piston 30 between seals 62 and 64 urges exhaust piston 30 toward supply port 28. Thus, due to the geometry of exhaust piston 30 and the locations of seals 62, 64, this pressurized control air exerts a force on the lower end of exhaust piston 30 which urges exhaust piston 30 upwardly and towards the exhaust passage 44 open position; however, this force is insufficient to overcome the opposing force applied to the other end of exhaust piston 30 by pressurized supply air in exhaust piston chamber 36. Thus, exhaust passageway 44 remains blocked while supply air pressure is applied.

FIG. 4 depicts the position of booster valve 12 during de-pressurization of the supply line 14. In this figure, the pressurized control air remains applied (as if the brake pedal 20 were being applied) and the supply pressure is de-pressurized (as if the parking brake were being applied). Thus, the force of the pressurized control air overcomes the force of the pressurized supply air and moves the exhaust piston 30 upwardly thereby opening exhaust passageway 44. Some of the relatively highly-pressurized control air then escapes expelling any liquid or other contaminants accumulated in main piston chamber 34 of booster valve 12. The contaminants are expelled into exhaust area 46 and out leaf valve 54 along path P2.

Referring again to FIG. 4, it should be understood that delivery valve 41 is in the delivery open position, allowing the supply port 26 to be in fluid communication with the delivery port 42 via path P1, in the manner discussed above.

Figure 5:
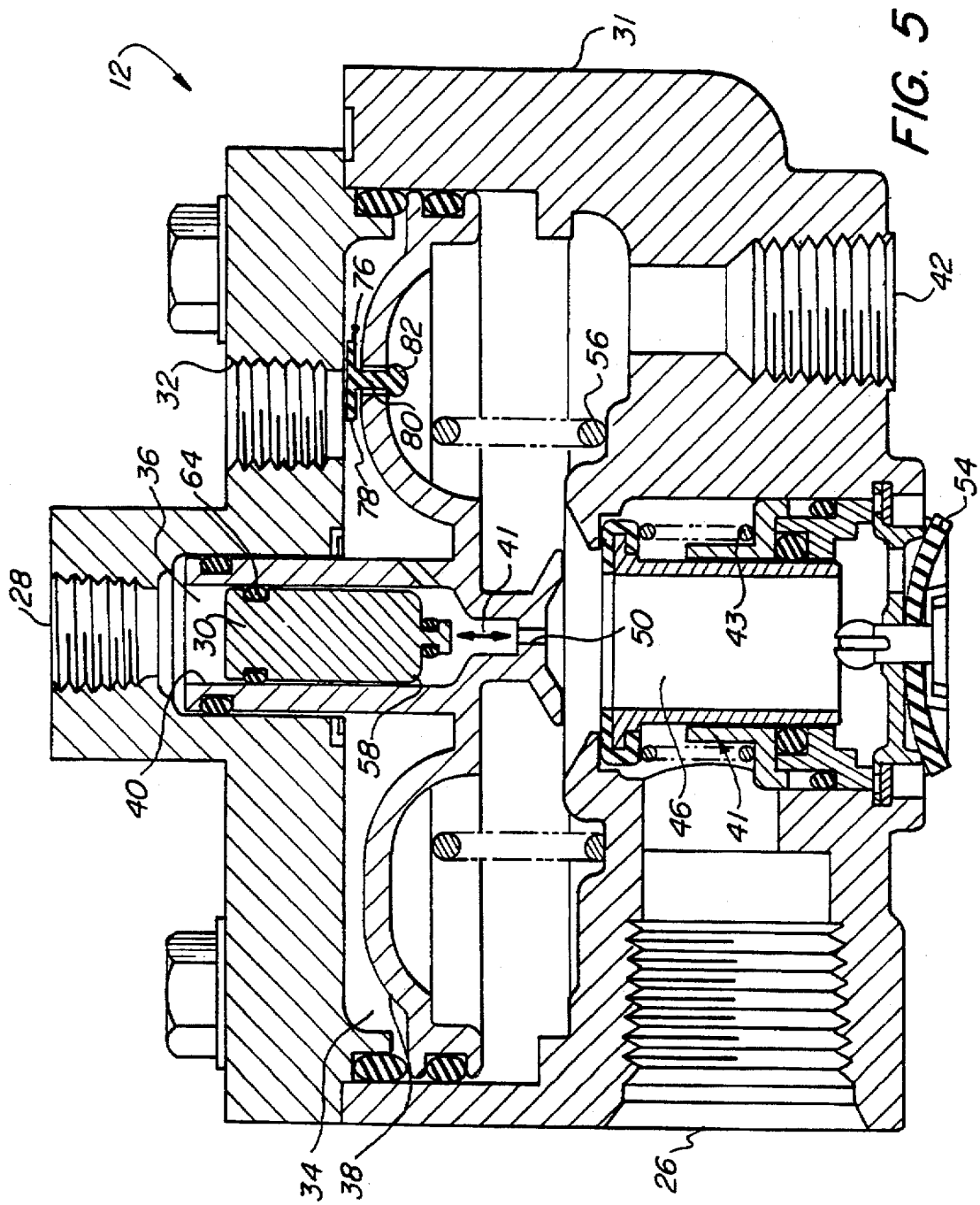
FIG. 5 is a cross-sectional view of the booster valve of FIG. 1 showing the position of the main and exhaust pistons and check valve after ejection and before resumption of normal operations, that is when pressurized supply and control air are not applied.

Referring to FIG. 5, after all of the pressurized control air escapes from main piston chamber 34 and/or the all of the pressurized control air is released, i.e., when the system is at rest, spring 56 biases main piston 38 to an uppermost or rest position. Exhaust piston 30 is capable of moving freely within hollow stem 40 of main piston 38 until such time as the pressurized supply air is re-applied, but due to the force of gravity, exhaust piston 30 comes to rest against the floor of stem 40. When supply pressure is re-applied, booster valve 12 again assumes the position depicted in FIG. 2.

While the system is at rest (FIG. 5), meeting surface 45 of delivery valve 41 and meeting surface 47 of main piston 38 (best shown in FIGS. 3, 4), are sealed against each other preventing supply port 26 from being in fluid communication with delivery port 42.

In the preferred embodiment described above, pressurized control air is utilized to move exhaust piston 30 when the supply air line is de-pressurized; however, this may be accomplished by other means. For example, one or more springs (not shown) could be used to bias exhaust piston 30 in the open position. Thus, if the supply air line were de-pressurized, the spring(s) would move exhaust piston 30, allowing the escape of control air from main piston chamber 34.

Figure 6:
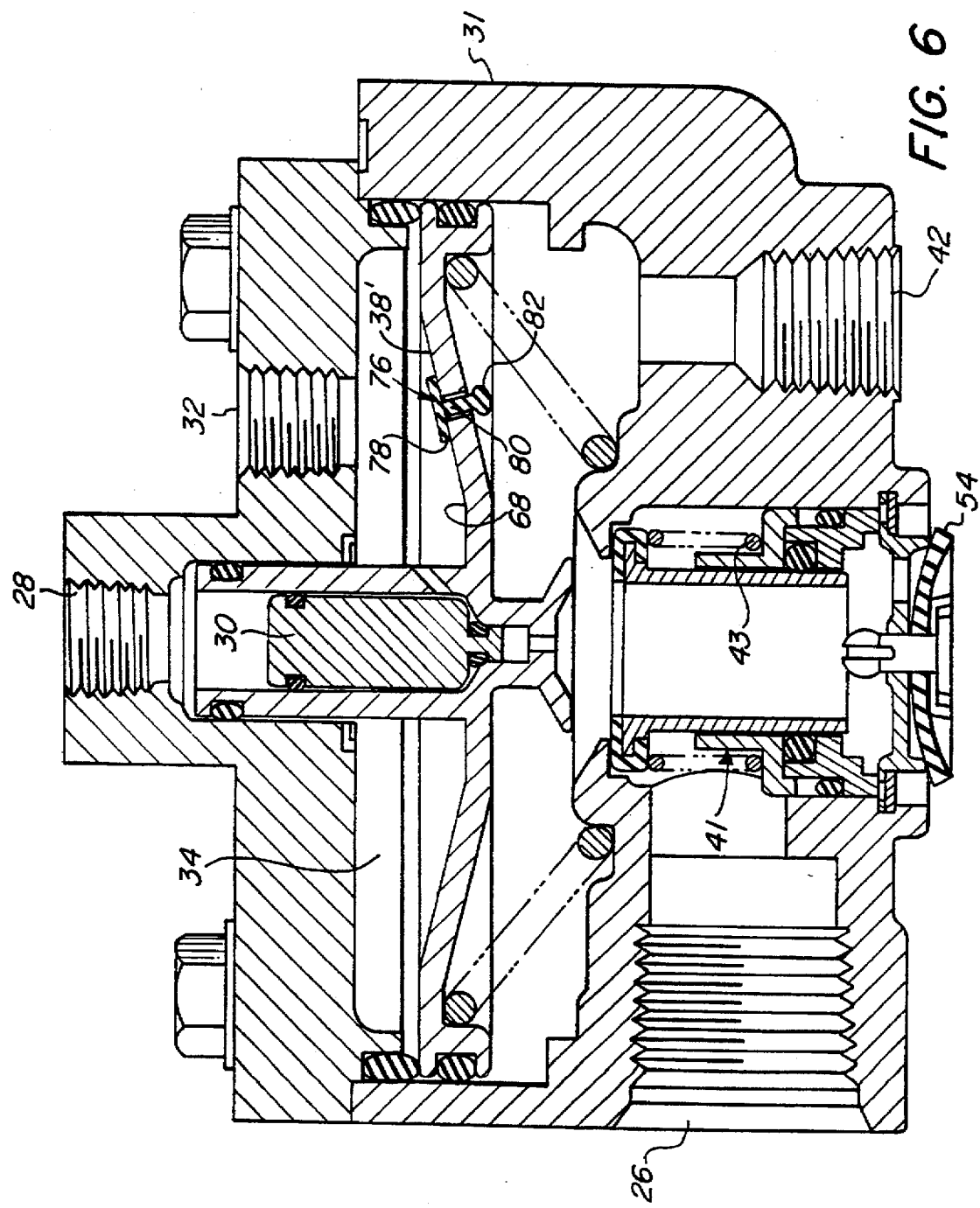
FIG. 6 is a cross-sectional view of an alternate embodiment of the booster valve shown in FIG. 1, showing a conically-shaped main piston.

FIG. 6 shows an alternate embodiment of booster valve 12, wherein like reference numerals indicate like elements. In order to aid in the expulsion of moisture and other contaminants from valve 12, main piston 38' may be conical in shape. Advantageously, the conical shape directs contaminants toward exhaust passageway 44, assisting in their expulsion, and also directs contaminants away from any valve seals and/or lubricants which are susceptible to damage thereby.

Also, the first section 48 of exhaust passageway 44, which connects hollow stem 40 to main piston chamber 34, preferably opens into main piston chamber 34 at or as close as possible to the face 68 of main piston 38'. This minimizes the amount of contaminants, if any, which is not expelled through exhaust passageway 44 when exhaust passageway 44 is opened. The conical shape at main piston 38' serves to allow the first section 48 of exhaust passageway 44 to be drilled adjacent the face 68 of main piston 38' to aid in drainage.

Although the invention has been described with reference to a particular arrangement of parts, features and the like, these are not intended to exhaust all possible arrangements or features, and indeed many other modifications and variations will be ascertainable to those of skill in the art. Accordingly, reference should be made primarily to the accompanying claims rather than the foregoing specification to determine the scope of the invention.

What is claimed is:

1. A contaminant-ejecting booster valve for a pneumatic brake, comprising:

a housing enclosing a chamber;

a control port in the housing in fluid communication with the chamber;

an exhaust port in the housing permitting removal of contaminants from the chamber;

a main piston mounted within the chamber and movable between a first position and a second position, the main piston having at least two sides and an orifice therethrough;

an exhaust passage through the main piston connecting the chamber and the exhaust port in fluid communication;

a blocking member movable between an open and closed position for opening and closing the exhaust passage, such that when the blocking member is in the open position it permits pressurized air from the control port to eject contaminants from the chamber; and a check valve covering the orifice of the main piston and movable between an open and a closed position, wherein the check valve is closed to prevent the flow of control air through the orifice when control air is applied and open to allow the flow of delivery air into the chamber when control air is released to equalize pressure on both sides of the main piston.

2. The contaminant-ejecting booster valve of claim 1, wherein the main piston includes a hollow stem, and wherein the blocking member comprises an exhaust piston slidably mounted within the hollow stem and movable between an exhaust passage open and an exhaust passage closed position.

3. The contaminant-ejecting booster valve of claim 2 wherein the main piston includes an inverted conical face adjacent the chamber to direct contaminants toward the exhaust passage and away from valve seals and lubricants.

4. The contaminant-ejecting booster valve of claim 2 wherein the housing includes a supply port for providing pressurized air to the valve, and a delivery port; the delivery port in a delivery position when connected in fluid communication with the supply port to provide pressurized air to a control port of a service relay valve when the main piston is in the second position.

5. The contaminant-ejecting booster valve of claim 4 wherein the main piston is moved to the second position under influence of pressurized control air.

6. The contaminant-ejecting booster valve of claim 5 wherein the delivery port is blocked from fluid communication with the supply port when the main piston is in the first position.

7. The contaminant-ejecting booster valve of claim 6 wherein the main piston is normally held in the first position by a spring.

8. The contaminant-ejecting booster valve of claim 1 including a supply port in the housing and wherein the blocking member closes the exhaust passage in response to pressurized air from the supply port.

9. The contaminant-ejecting booster valve of claim 8 wherein the blocking member opens the exhaust passage under influence of control pressure upon release of pressurized air from the supply port.

10. A booster valve for a pneumatic brake, comprising:

a housing enclosing a chamber;

a main piston mounted within the chamber and having two sides and an orifice therethrough, the main piston movable between a first position and a second position;

an exhaust passage through the main piston connecting the chamber and an exhaust port in fluid communication;

a blocking member movable between an open and closed position for opening and closing the exhaust passage, such that when the blocking member is in the open position it permits pressurized air from a control port to eject contaminants from the chamber, and wherein the blocking member closes the exhaust passage in response to pressurized air from a supply port, wherein the blocking member opens the exhaust passage under influence of control pressure upon release of pressurized air from the supply port; and a check valve covering the orifice of the main piston and movable between an open and a closed position, wherein the check valve is closed to prevent the flow of control air through the orifice when control air is applied and open to allow the flow of delivery air into the chamber when control air is released.

11. The booster valve for a pneumatic brake of claim 10, wherein the main piston includes a hollow stem, and wherein the blocking member comprises an exhaust piston slidably mounted within the hollow stem and movable between an exhaust passage open and an exhaust passage closed position.

12. The booster valve for a pneumatic brake of claim 11, wherein the main piston includes an inverted conical face adjacent the chamber to direct contaminants toward the exhaust passage and away from valve seals and lubricants.

13. The booster valve for a pneumatic brake of claim 12, wherein the housing comprises a second supply port for providing pressurized air to the booster valve, and a delivery port; the delivery port in a delivery position when connected in fluid communication with the second supply port to provide pressurized air to a control port of a service relay valve when the main piston is in the second position.

14. The booster valve for a pneumatic brake of claim 13, wherein the main piston is moved to the second position under influence of pressurized control air.

15. The booster valve for a pneumatic brake of claim 14, wherein the delivery port is blocked from fluid communication with the second supply port when the main piston is in the first position.

* * * * *